United States Patent Office 3,301,860
Patented Jan. 31, 1967

3,301,860
DIOXOINDANYL-QUINOLYL-BENZOTHIAZOLE
COMPOUNDS
Ray Allen Clarke, Pitman, N.J., assignor to E. I. du Pont
de Nemours and Company, Wilmington, Del., a corporation of Delaware
No Drawing. Filed Feb. 14, 1964, Ser. No. 344,839
7 Claims. (Cl. 260—288)

The present invention is directed to dioxoindanyl-quinolyl-benzothiazoles which are significantly useful as substantive dyes for cellulosic substrates such as paper pulp, paper, cotton or rayon and to a process for preparing said dyes. This application is a continuation-in-part of my copending application Serial No. 207,014, filed July 2, 1962, now abandoned.

The inventor faced the problem of providing strong, bright, green-yellow dyes which possess desired substantivity properties for cellulose substrates. Other objects achieved by this invention include (a) economy of manufacture, (b) ready application of the water-soluble members to paper pulp, particularly less critical with respect to pH range in the application process as compared with the sulfoquinophthalones, now in the trade, (c) to provide useful disperse dyes for hydrophobic fibers such as cellulose acetate, polyester and polyacrylonitrile fibers. In other words, the unsulfonated novel compounds of this invention provide:

(a) Disperse dyes
(b) Intermediates for their water-soluble derivatives

The sulfonated novel compounds provide:

(A) Direct (or substantive) dyes
(B) Acid dyes

Another object of the present invention is to provide improved processes for condensation of phthalic anhydrides with the 2-methylquinolyl-benzothiazolesulfonic acids, a reaction that is not successful when attempted in the conventional inert organic solvents such as ortho-dichlorobenzene. The latter solvent is satisfactory in the present series of compounds when a sulfo group is not present.

These and other objects will become apparent in the following description and claims.

More specifically, the present invention is directed to a dye of the formula:

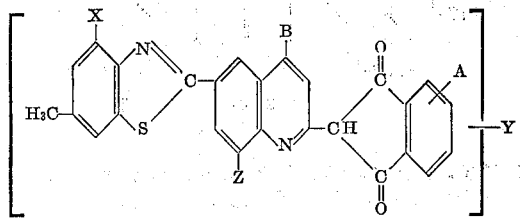

wherein X is H or $CH_3$; Y is H or $SO_3M$; Z is H, $CH_3$ or $SO_3M$; A is H, F, Cl, Br, $NO_2$, $NH_2$ or COOM; B is H, Cl, Br, OH or $NR_1R_2$ where $R_1$ is H or a $C_{1-4}$ alkyl, and $R_2$ is a $C_{1-4}$ alkyl, benzyl or monocyclic aryl radical; M is H, $NH_4$, an alkali metal or $NH_2(CH_3)_2$.

Preferred dyes include:

(A) 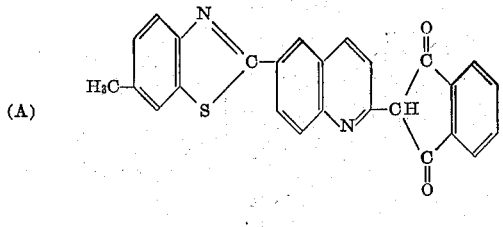

(B) 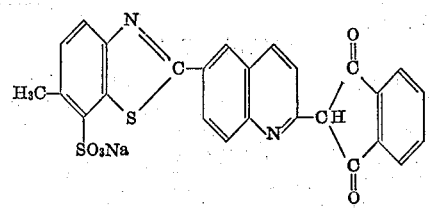

(C) 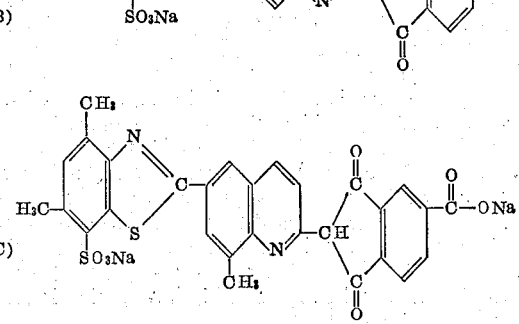

(D) 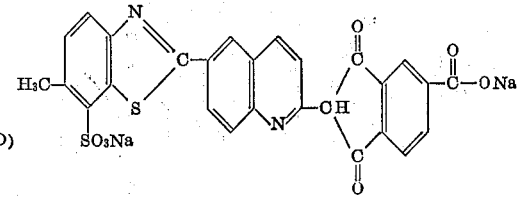

(E) 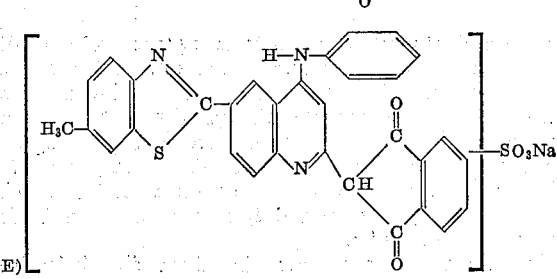

Various routes to the 2-methylquinolylbenzothiazole starting materials for the present invention are set forth in my copending application Serial No. 207,093, filed July 2, 1962, now U.S. Patent No. 3,152,132. Said starting materials and others disclosed herein are condensed with phthalic anhydride or a derivative thereof, if no sulfo groups are present, in either an inert organic solvent such as ortho-dichlorobenzene or in an amide solvent, dimethylformamide or dimethylacetamide, or in a mixture of these solvents, optionally followed by sulfonation of the phthalone compound.

When the starting materials for the novel quinophthalones contain sulfo groups, it is preferred to condense them in the presence of an amide solvent in order to obtain satisfactory yields and quality. The preferred process may be defined as a process for preparing the novel dyes whereby more than 1 mole of phthalic anhydride or derivative thereof is condensed with 1 mole of a compound of the formula which contains at least one sulfo group:

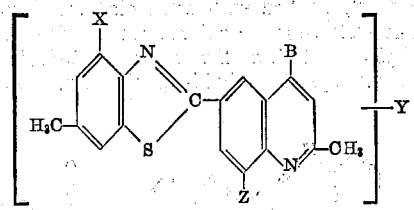

wherein X is H or $CH_3$; Y is H or $SO_3M$; Z is H, $CH_3$ or $SO_3M$; and B is H, Cl, Br, OH or $NR_1R_2$ where $R_1$ is H or a $C_{1-4}$ alkyl, and $R_2$ is a $C_{1-4}$ alkyl, benzyl or monocyclic aryl radical, in the presence of a reaction promotor selected from the group consisting of dimethylformamide and dimethylacetamide.

Representative examples illustrating the present invention follow.

EXAMPLE 1

(a) A mixture consisting of 74 parts of 6-methyl-2-(2-methyl-6-quinolyl)-7-benzothiazolesulfonic acid, 148 parts of phthalic anhydride and 72 parts of dimethylformamide are stirred at 175° to 185° C. for 20 hours. The reaction mass is drowned in 3000 parts of water and the dye precipitates as the dimethylamine salt in the form of yellow needles. (Partial decomposition of dimethylformamide provides the dimethylamine.) 180 parts of 37% hydrochloric acid are added to the slurry at 90° to 95°C., at which temperature agitation is continued for one hour. The slurry is now a brick red color. The insoluble free acid form of the dye is filtered from the hot slurry and dried. An excellent yield of the product 2-[2-(1,3-dioxo-2-indanyl) - 6 - quinolyl] - 6 - methyl-7-benzothiazolesulfonic acid, having the following formula is obtained:

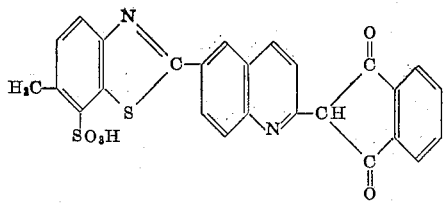

Its spectral absorption curve from aqueous solution of sodium salt shows a maximum at about 422 millimicrons.

The dry form of the dye is mixed with alkaline diluents such as sodium carbonate, lithium carbonate, sodium borate, potassium carbonate, ammonium carbonate, sodium metasilicate, or mixtures of these compounds, in about equal parts by weight to obtain a product which dissolves readily in water and dyes paper or cotton fabric in green-yellow shades.

In an alternate procedure, the above dimethylamine salt of the dye is heated in 2000 parts of 3% sodium hydroxide (or LiOH or KOH) for one hour at 90° to 95°C. followed by cooling the slurry and filtering off the dye in the form of its sodium (Li or K) salt.

(b) The procedure of part (a) is repeated, using 72 parts of dimethylacetamide in place of the dimethylformamide. The dye, isolated as in part (a), is obtained in excellent yield and purity.

EXAMPLE 2

(a) A mixture consisting of 100 parts of the hydrochloride of 6-methyl-2-(2-methyl-6-quinolyl)benzothiazole, 133 parts of phthalic anhydride, 68 parts of dimethylformamide, 240 parts of ortho-dichlorobenzene and 10 parts of sodium acetate is stirred at 170° to 180°C. for 8 hours. Water formed during the condensation reaction is allowed to escape through a water separator in order to maintain the stated temperature. The reaction product is mainly crystallized as an orange precipitate. The mass is cooled to 40° to 50°C. and the dye filtered off, washed with ortho-dichlorobenzene and dried. The yellow-orange colored product is obtained in excellent yield. It has the name 2-[2-(1,3-dioxo-2-indanyl)-6-quinolyl]-6-methyl-benzothiazole, and the formula:

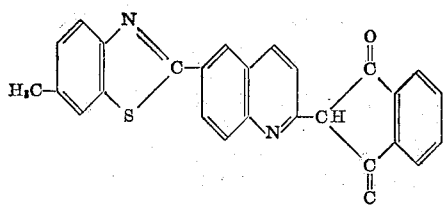

Although the dimethylformamide may be omitted in the present example, it serves as a reaction promoter, increases the rate of reaction and affords a purer dye. Sodium acetate aids in the fluidity of the reaction mass, particularly during the initial stages of the reaction.

(b) Sulfonation.—80 parts of the disperse dye prepared in part (a) of the present example are added slowly to 300 parts of 100% sulfuric acid (monohydrate) while maintaining the temperature at 15° to 25°C. by means of cooling the outside of the reaction vessel. After stirring for one hour, 250 parts of 65% oleum ($H_2SO_4$ containing dissolved $SO_3$ to the extent of 65% of total weight) are added slowly while maintaining the temperature of the sulfonation mass at 15° to 25°C. After 20 hours at this temperature, a sample removed from the mass gives a clear solution in water neutralzied with sodium carbonate. The sulfonation mass is then slowly poured into 5,000 parts of water containing 742 parts of sodium carbonate and 500 parts of sodium chloride. The solution is alkaline throughout the drowning step. The dye precipitates as the sodium salt and is filtered off at 50°C. in good yield. It dyes paper and cotton textiles in green-yellow shades close in hue to that obtained from the dye of Example 1(a).

Any of the various isomeric compounds and mixtures prepared in said U.S. Patent No. 3,152,132, will serve as starting materials for condensation with phthalic anhydride according to the methods described herein for the sulfo and non-sulfo-containing compounds, respectively. Others than those in Examples 1 and 2 are:

EXAMPLE 3

Starting material

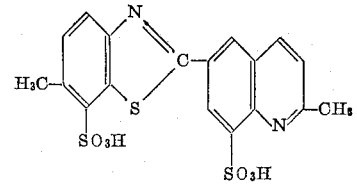

6 - methyl - 2 (2-methyl-8-sulfo-6-quinolyl)-7-benzothiazole-sulfonic acid.

Final dye

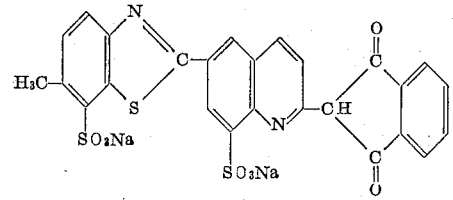

2-[2-(1,3 - dioxo-2-indanyl)-8-sulfo-6-quinolyl]-6-methyl-7-benzothiazolesulfonic acid, sodium salt.

EXAMPLE 4

Starting material

Example 1((B) of said U.S. Patent No. 3,152,132.

Final dye

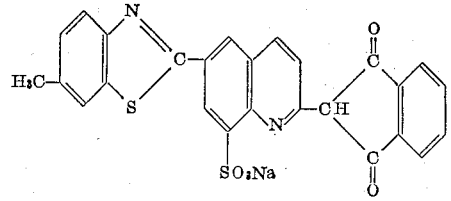

EXAMPLE 5

*Starting material*

Example 3(A) of said U.S. Patent No. 3,152,132.

*Final dye*

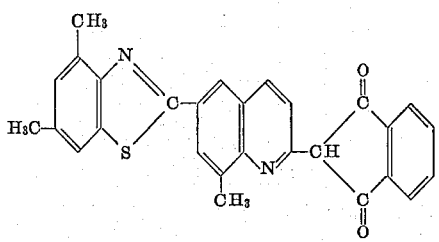

EXAMPLE 6

*Starting material*

The intermediate is obtained by reacting paraldehyde with the high temperature sulfur fusion product from an equal molar mixture of p-toluidine and 2,4-xylidine.

*Final dye*

A mixture consisting of 2.4 parts of 6-methyl-2-(2-ing structural formulae:

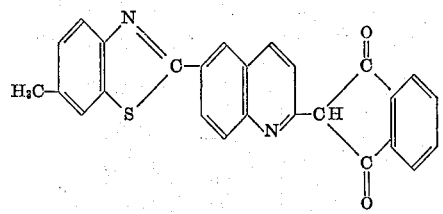

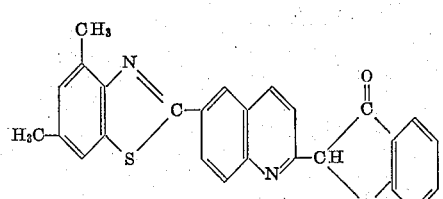

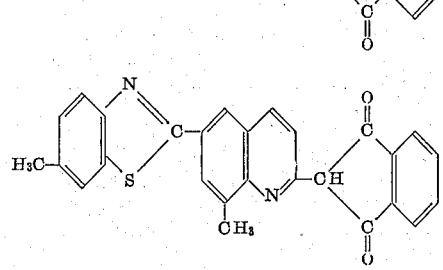

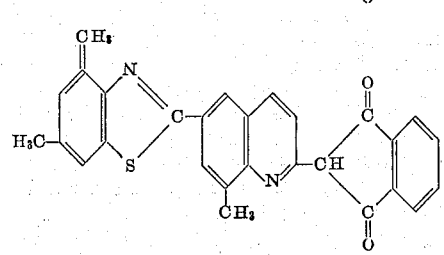

EXAMPLE 7

A mixture consisting of 7.4 parts of 6-methyl-2-(2-methyl-6-quinolyl)-7-benzothiazolesulfonic acid, 21 parts of trimellitic anhydride and 10 parts of dimethylformamide is heated at 175° to 185°C. for about 20 hours. The reaction mass is diluted with approximately 270 parts of water, and 20 parts of a 30% sodium hydroxide solution are added. The slurry is heated to 70°C. and 30 parts of sodium chloride are added to precipitate most of the dye from the solution. The slurry is cooled to 40°C., and the dye is isolated by filtration and dried. An excellent yield of the product 2-[2-(5-carboxy-1,3-dioxo-2-indanyl)-6-quinolyl]-6-methyl-7-benzothiazolesulfonic acid, disodium salt, having the following formula is obtained.

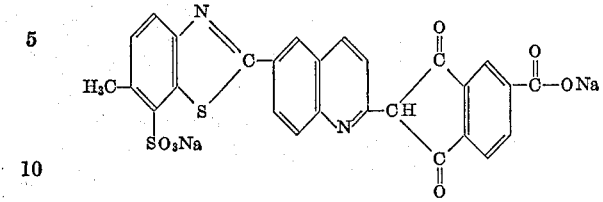

In aqueous solution the dye shows a maximum absorption in the spectral transmission curve at 428 millimicrons. The dye has excellent solubility and dyes paper without the use of size and alum in strong green-yellow shades.

EXAMPLE 8

(a) The procedure of Example 7 is followed except that the 21 parts of trimellitic anhydride are replaced with 21 parts of 4-nitrophthalic acid. The product is isolated from a strongly alkaline solution as in Example 7 above and dried at 100° C. The product 2-[2-(5-nitro-1,3-dioxo-2-indanyl) - 6 - quinolyl]-6-methyl-7-benzothiazolesulfonic acid, sodium salt has the following structure

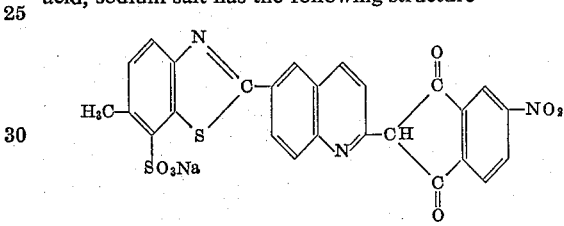

It shows low solubility in cold water but dyes cotton strong red-yellow shades from a hot dye bath.

(b) One and three tenths parts of the dye of part (a) of this example are suspended in 50 parts of water to which are added 0.5 part of a 30% sodium hydroxide solution and 0.5 part of sodium sulfide. The mixture is agitated and heated at the boiling temperature for approximately one hour. The resulting dye 2-[2-(5-amino-1,3 - dioxo - 2 - indanyl) - 6 - quinolyl]-6-methyl-7-benzothiazolesulfonic acid, sodium salt, which is isolated by salting, is soluble in cold water and dyes paper and cotton in red-yellow shades. In aqueous solution it shows a maximum absorption in the spectral transmission curve at 434 millimicrons.

EXAMPLE 9

(a) The procedure of Example 7 is followed except that the 21 parts of trimellitic anhydride are replaced with 21 parts of 3-nitrophthalic acid. The resulting dye, 2-[2-(4 - nitro - 1,3 - dioxo - 2-indanyl)-6-quinolyl]-6-methyl-7-benzothiazolesulfonic acid, sodium salt, is much greener in shade than that of Example 8(a) and has much better solubility in cold water. It dyes paper and cotton in attractive yellow shades. In aqueous solution it shows a maximum absorption in its spectral transmission curve at 424 millimicrons.

(b) The reduction of the nitro group to the amino group in the dye of part (a) of the present example is carried out in the same manner as for Example 8(b). The resulting dye shows excellent substantivity to paper and cotton, and is also much greener in shade than the corresponding amino-containing dye of Example 8(b).

EXAMPLE 10

(a) The procedure of Example 7 is followed except that the 21 parts of trimellitic anhydride are replaced with 25 parts of pyromellitic acid. The dye obtained dyes wool from a slightly acidic dye bath (pH 4) and cotton from a neutral or slightly alkaline dye bath. Its aqueous solution shows a maximum absorption in the spectral transmission curve at 432 millimicrons.

(b) The procedure of Example 7 is followed except that the 21 parts of trimellitic anhydride are replaced with 20 parts of 4-chlorophthalic acid. The dye obtained shows affinity for wool, cotton and nylon giving a pleasing green-yellow shade. Its aqueous solution shows a miximum absorption in the spectral transmission curve at 433 millimicrons.

Similar results are obtained when the 4-chlorophthalic acid used in this example is replaced by chemically equivalent amounts of 3-chlorophthalic acid, 3- or 4-fluorophthalic acid or with 3- or 4-bromophthalic acid.

EXAMPLE 11

A mixture consisting of 10.5 parts of 4,6-dimethyl-2-(2,8 - dimethyl - 6-quinolyl)-7-benzothiazolesulfonic acid, having the following formula

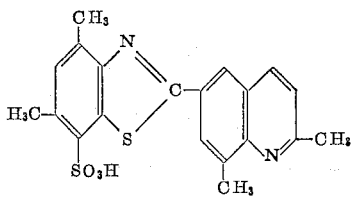

23.0 parts of trimellitic anhydride and 10 parts of dimethylformamide is heated for 4 hours at 180° to 185° C. The reaction mass is taken up in 400 parts of water, and 100 parts of 30% sodium hydroxide solution are added. The dye slurry is heated to 70° to 80°C. and 40 parts of sodium chloride are added to aid precipitation of the dye. The dye slurry is cooled to 40°C., filtered and the dye is dried at 100° C. An excellent yield of 2-[2-(5-carboxy-1,3 - dioxo-2-indanyl)-8-methyl-6-quinolyl]-4,6-dimethyl-7-benzothiazolesulfonic acid, disodium salt having the following formula is obtained.

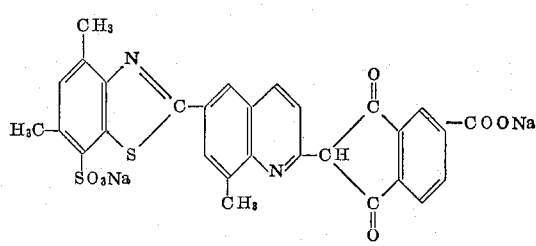

This dye dissolves readily in cold water showing a maximum absorption in the spectral transmission curve at 434 millimicrons. It dyes paper pulp without the use of size and alum in a yellow shade slightly redder than that of the dye in Example 7.

EXAMPLE 12

A mixture consisting of 16 parts of the hydrochloride of 6 - methyl - 2-(2-methyl-6-quinolyl)benzothiazole, 45 parts of pyromellitic acid, 2 parts of anhydrous sodium acetate, 39 parts of ortho-dichlorobenzene and 30 parts of dimethylformamide is stirred and heated for 18 hours at 180°C. Water formed during the condensation is condensed and separated from the condensate by a water separator and the solvent is returned to the reaction mass. At the end of the heating period the hot reaction mass is diluted with 50 parts of ortho-dichlorobenzene and is filtered. The precipitate is washed in turn with ortho-dichlorobenzene and isopropanol, and is then dried. The dimethylamine salt of the dye thus obtained is converted to the water soluble disodium salt by heating at 90°C. in 10% sodium chloride solution containing 3% sodium hydroxide. The disodium salt is isolated by filtration, and is then dried. An excellent yield of the dye is obtained. It has the name 2-[2-(5,6-dicarboxy-1,3-dioxo-2-indanyl)-6-quinolyl]-6-methylbenzothiazole, disodium salt, and the formula

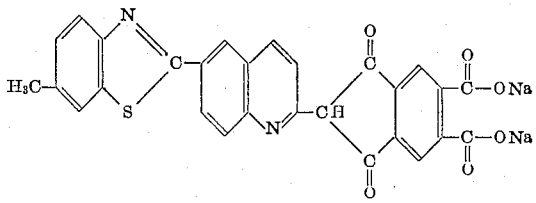

An aqueous solution of this dye exhibits a maximum in the spectral transmission curve at 435 millimicrons.

EXAMPLE 13

(a) One hundred and twenty parts of dehydrothio-p-toluidine, 98 parts of acetoacetic ester and 600 parts of glacial acetic acid are heated at 50°C. for 6 hours. After cooling to room temperature the crystalline mass is diluted with 600 parts of isopropanol, and filtered. The Schiff's base product is dried at 80°C. Ninety-five parts of this material are heated in 1000 parts of trichlorobenzene at reflux temperature (216°–218°C.) for 2 hours. After the first 30 minutes of heating the product starts to crystallize from the solution. The reaction mass is cooled to 40°–50°C., filtered and the filtercake is washed with benzene, and dried. This product has a melting point above 300°C. It has the name 6-methyl-2(4-hydroxy-2-methyl-6-quinolyl)benzothiazole and the structural formula:

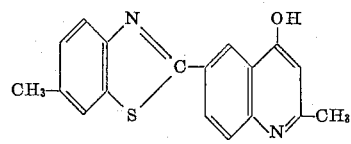

(b) Sulfonation procedure

The 4-hydroxy-6-quinolyl benzothiazole derivative obtained in part (a) is sulfonated as follows:

19 parts of the above hydroxybenzothiazole are added to 100 parts of 100% sulfuric acid (monohydrate) at 20°–25°C. Sixty parts of 65% oleum are added dropwise to the sulfonation mass while holding the temperature at 20°–25°C. After stirring for 4 hours the sulfonation mass is drowned in 1000 parts of water and ice, and the product is isolated by filtration, washed with water and dried. The position of the sulfo group in the product was not determined.

(c) A mixture of 10 parts of the 6-methyl-2-(4-hydroxy-2-methyl-6-quinolyl)benzothiazolesulfonic acid obtained in part (b), 25 parts phthalic anhydride and 25 parts of dimethylformamide is heated approximately 18 hours at 180°–185°C. The fluid reaction mass is then poured into 400 parts of water. Upon adding 27 parts of a 30% sodium hydroxide solution the dye is completely dissolved. This solution is heated to 95°C. and 45 parts of salt (sodium chloride) are added to precipitate most of the dye from the solution. The dye slurry is cooled to 60°C. and the dye is isolated by filtration and is then dried at 100° C. This product is 2-[2-(1,3-dioxo-2-indanyl) - 4 - hydroxy - 6 - quinolyl]-6-methyl-benzothiazolesulfonic acid, sodium salt and has the structural formula

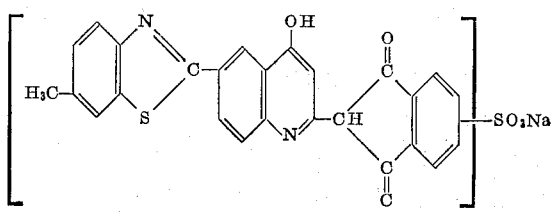

EXAMPLE 14

(a) 6-methyl-2-(4-chloro-2-methyl-6-quinolyl) - benzothiazole is prepared by treating 16 parts of the 4-hydroxyquinolyl-benzothiazole derivative of Example 13(a) in 40 parts ortho-dichlorobenzene with 15.5 parts phosphorus oxychloride at 110° C. for one hour. The reaction mass is poured into a mixture of 100 parts of ice and 50 parts of 30% sodium hydroxide solution. An additional 26 parts of ortho-dichlorobenzene are used to rinse out the flask. The mixture is warmed to 50° C. and the water layer is drawn off and discarded. The ortho-dichlorobenzene layer is transferred to a flask and the ortho-dichlorobenzene is removed by steam distillation. The granular solid is filtered off and dried at 100° C. It melts at 197°–199° C.

When the phosphorus oxychloride used in this example is replaced by 30 parts of phosphorus oxybromide, the 6-methyl-2 - (4-bromo-2-methyl-6-quinolyl)benzothiazole is obtained.

(b) A mixture of 5 parts of 6-methyl-2-(4-chloro-2-methyl-6-quinolyl)benzothiazole, 15 parts of phthalic anhydride, and 5 parts of dimethylformamide is heated 18 hours at 180°–185° C. The reaction mass is diluted with approximately 50 parts of isopropanol, heated to 80° C., filtered and the product is washed with isopropanol and dried. The yellow-orange colored quinophthalone is 2-[2-(1,3-dioxo-2-indanyl) - 4-chloro-6-quinolyl]-6-methylbenzothiazole of the formula

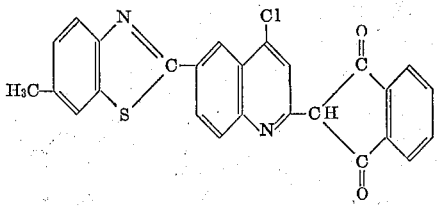

When the 6-methyl-2 - (4-bromo-2-methyl-6-quinolyl)-benzothiazole is condensed with phthalic anhydride as described in this example, the corresponding bromoquinophthalone derivative is obtained.

(c) *Sulfonation*

Five parts of the chloroquinophthalone derivative of part (b) above are added to 30 parts of 100% sulfuric acid (monohydrate) while maintaining the temperature at 20°–25° C. Thirty parts of 65% oleum are added slowly while maintaining the temperature of the sulfonation mass at 20°–25° C. After standing for 18 hours the sulfonation mass is drowned into 500 parts of water containing 75 parts of sodium carbonate and 50 parts of sodium chloride. The precipitated dye is filtered off and dried. It dyes paper and cotton in attractive medium yellow shades.

When the corresponding bromoquinophthalone derivative of part (b) of this example is sulfonated by the above method, a water soluble dye is obtained which dyes paper and cotton in yellow shades.

EXAMPLE 15

(a) 6-methyl-2-(4-anilino - 2 - methyl-6-quinolyl)benzothiazole is prepared by treating 15 parts of the 4-chloroquinolyl-benzothiazole derivative of Example 14(a) with 30 parts aniline at reflux temperature for 4.5 hours. The reaction mass is allowed to cool to room temperature, diluted with 20 parts of toluene and filtered. The filtercake is washed with toluene and then dried. The quinaldine thus obtained is in the form of its hydrochloride salt.

The above quinaldine intermediate containing other amino groups in the 4-quinolyl position are prepared by reacting amines such as: methylamine, ethylamine, propylamine, butylamine, benzylamine, the toluidines, piperidine, dimethylamine, diethylamine, dipropylamine, dibutylamine, N-methylaniline, N-methyl-m or p-toluidine, benzylmethylamine or N-ethylaniline with 6-methyl-2-(4-chloro-2-methyl - 6 - quinolyl)benzothiazole according to the above procedure. However, the amines which boil below 180° C. are reacted in alcoholic solution in a closed vessel at 180°–190° C. for about 5 hours.

(b) A mixture of 4 parts of the hydrochloride of 6-methyl-2-(4-anilino-2-methyl - 6 - quinolyl)benzothiazole, 8 parts of phthalic anhydride and 6 parts of dimethylformamide is heated at 180°–185° C. for 7 hours. The reaction mass is then diluted with 30 parts of isopropanol, heated to 80° C. to dissolve the excess phthalic anhydride, cooled to 40° C., filtered and dried. The dried product, a yellow-orange crystalline compound melting above 340° C., is obtained in excellent yield. The 2-[2-(1,3-dioxo-2-indanyl)-4-anilino-6-quinolyl] - 6 - methylbenzothiazole thus obtained has the formula

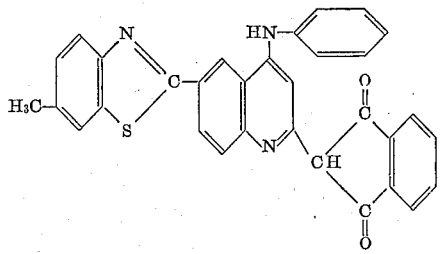

When the above 4-anilino-2-methyl-6-quinolylbenzothiazole is replaced by 4 parts of the related quinaldines prepared as described in the last paragraph of part (a) of this example, quinophthalones having similar properties are obtained.

(c) *Sulfonation*

Three parts of the insoluble dye of part (b) above are added to 16 parts of 100% sulfuric acid (monohydrate) while maintaining the temperature between 15° and 25° C. Twelve parts of 65% oleum are then added slowly to the sulfonation mass while maintaining the temperature in the range of 15° to 25° C. Complete sulfonation is obtained in about two hours as indicated by removing a sample and obtaining a clear solution in water containing sufficient sodium carbonate to neutralize the acid. The reaction mass is drowned in 500 parts of water containing 30 parts of sodium chloride and 30 parts of sodium hydroxide. The dye slurry is heated to 80°–90° C. and an additional 60 parts of sodium chloride are added to aid complete precipitation of the dye. The dye is isolated by filtration and is dried at 100° C. It dyes paper and cotton in very attractive green-yellow shades. Its aqueous solution shows a maximum in the spectral transmission curve at 412 millimicrons.

Any of the amino-substituted quinophthalones prepared as described in the last paragraph of part (b) of this example may be sulfonated in the same way to provide water-soluble yellow dyes for paper and cotton.

EXAMPLE 16

(a) *Typical dyeing procedure for paper pulp*

Two-tenths (0.2) part of the dry powder mixture obtained according to Example 1(a) (by mixing equal parts of the monosulfo dye prepared in that example and sodium metasilicate) is added to an aqueous slurry of 100 parts (dry basis) of bleached sulfite pulp in 5,000 parts of water at 2° to 38° C. Two parts each of rosin size and alum $(Al_2(SO_4)_3 \cdot 18H_2O)$ are then added, the mixture is thoroughly agitated for 10 to 20 minutes, and water is added to give a total of 20,000 parts. Paper sheet is then made up in the manner well known in the art of paper making to provide paper which is dyed a bright green-yellow shade. A shade of medium strength is obtained.

The amount of dye employed in the present dyeing procedure may be varied from 0.01 to 1.0 part (based on active ingredient) to give lightly tinted to deeply colored dyeings. The percent by weight of air dried paper pulp in the initial slurry may vary from 0.4 to 3. Likewise, the amount of rosin size and alum used in the process may vary from about 0.5 to 3 parts and from 1 to 4 parts, respectively, or these additives may be omitted.

The sulfo-containing dyes of this invention are substantive to paper pulp so that the use of size and alum is omitted when paper stock for use in colored tissue and the like is being dyed.

(b) Disperse dyeing

The novel dyes of the present invention which are free of sulfo groups are milled to obtain finely divided particles, preferably in the presence of a dispersing agent, and the resulting composition is applied to cellulose acetate from an aqueous soap bath at 70° to 85° C. Green-yellow dyeings are obtained.

(c) Acid dyeing

The novel dyes herein which contain sulfonic acid groups are applied to wool fibers from a hot aqueous dye bath containing sodium sulfate and small amounts of sulfuric acid by well known procedures. The wool is dyed in strong yellow shades.

Numerous uses are illustrated in the examples (see e.g., Example 16) together with those mentioned in column 1, line 9 to col. 2, line 8 of this specification.

The advantages of the present novel dyes have been summarized in this specification. The novel sulfo dyes exhaust onto paper pulp satisfactorily from a dye bath at pH 4 to 6. This is a significant advantage in general trade applications. Another significant advantage over prior art dyes is excellent substantivity or utilization of the dye by the cellulosic materials over a wide pH range such that in the paper dyeing process no size and alum are required.

When one part of a dye-sulfonic acid or dye-sulfonic acid dimethylamine salt of this invention is heated to about 60° C. with about 5 or more parts of a 2% polyethylene glycol solution of sodium hydroxide (or KOH), the dye dissolves to form a clear solution which is useful in the coloration of paper and cellulosic fibers from aqueous dyebaths.

The preceding representative examples may be varied within the scope of the present total specification disclosure, as understood and practiced by one skilled in the art, to achieve essentially the same results. For instance the sulfonic acids of the novel dyes are disclosed in the form of their free acids, their alkali metal, ammonium or dimethylamine salts. It is to be understood that the sulfonic acid and carboxylic acid dye anions may be associated with the cations: $H^+$, $Li^+$, $Na^+$, $K^+$, $NH_4^+$, $(CH_3)_2NH_2^+$ or mixtures of these cations.

As many apparently widely different embodiments of this invention may be made without departing from the spirit and scope thereof, it is to be understood that this invention is not limited to the specific embodiments thereof except as defined in the appended claims.

What is claimed is:

1. A dye of the formula

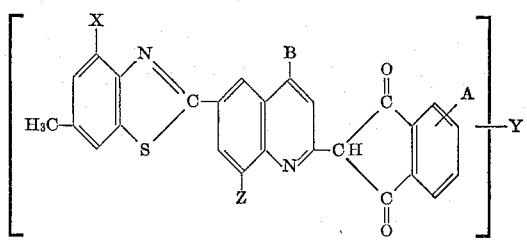

wherein X is selected from the group consisting of H and $CH_3$; Y is selected from the group consisting of H and $SO_3M$; Z is selected from the group consisting of H, $CH_3$ and $SO_3M$; A is selected from the group consisting of H, F, Cl, Br, $NO_2$, $NH_2$ and COOM; B is selected from the group consisting of H, Cl, Br, OH, piperidyl and $NR_1R_2$ where $R_1$ is selected from the group consisting of H and a $C_{1-4}$ alkyl and $R_2$ is selected from the group consisting of a $C_{1-4}$ alkyl, benzyl and monocarbocyclic aryl; M is a cation selected from the group consisting of $H^+$, $NH_4^+$, $Li^+$, $Na^+$, $K^+$ and $(CH_3)_2NH_2^+$.

2. The dye:

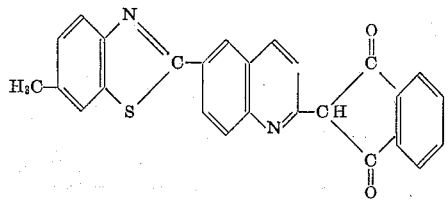

3. The dye:

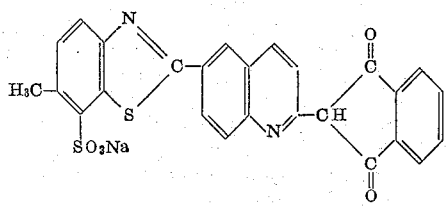

4. The dye:

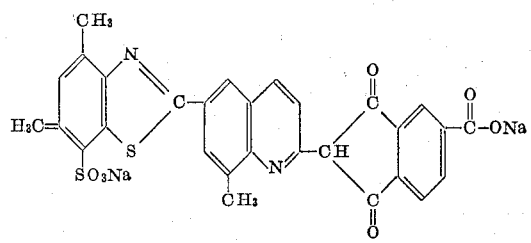

5. The dye:

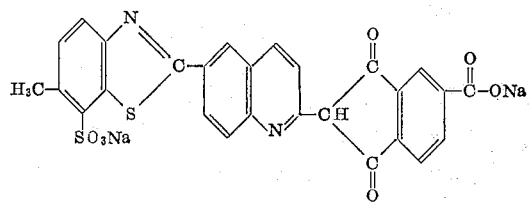

6. The dye:

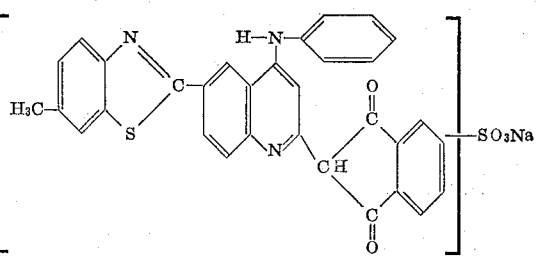

7. A process for preparing a dye of the formula which contains at least one sulfo group

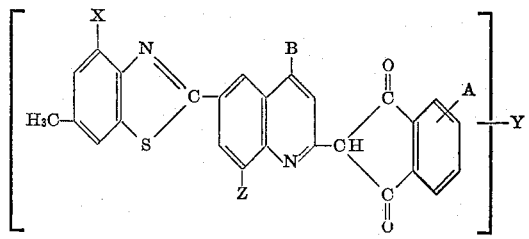

wherein X is selected from the group consisting of H and —$CH_3$, Y is selected from the group consisting of H and —$SO_3M$, Z is selected from the group consisting of H, —$CH_3$ and —$SO_3M$ and A is selected from the group consisting of H, F, Cl, Br, $NO_2$, $NH_2$ and COOM; B is selected from the group consisting of H, Cl, Br, OH, piperidyl and $NR_1R_2$ where $R_1$ is selected from the group consisting of H and a $C_{1-4}$ alkyl and $R_2$ is selected from the group consisting of a $C_{1-4}$ alkyl, benzyl and monocarbocyclic aryl; M is a cation selected from the group consisting of $H^+$, $NH_4^+$, $Li^+$, $Na^+$, $K^+$ and $(CH_3)NH_2^+$; in which process more than 1 mole of phthalic anhydride or derivative thereof is condensed with 1 mole of a compound of the formula:

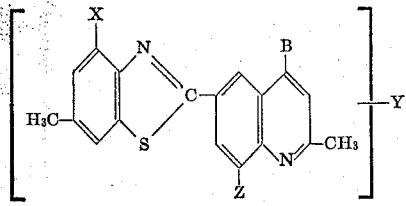

wherein X, Y, Z and B are as heretofore defined, said condensation being conducted in the presence of a reaction promoter selected from the group consisting of dimethylformamide and dimethylacetamide.

References Cited by the Examiner

UNITED STATES PATENTS 2,006,022　6/1935　Kranzlein et al. _____ 260—287
3,152,132　10/1964　Clarke _____ 260—288

ALEX MAZEL, *Primary Examiner.*

D. G. DAUS, *Assistant Examiner.*